United States Patent [19]
Hoch, Jr. et al.

[11] Patent Number: 5,090,436
[45] Date of Patent: Feb. 25, 1992

[54] TEMPERATURE SENSITIVE WATER SUPPLY SHUT-OFF SYSTEM

[76] Inventors: John R. Hoch, Jr., 13 Delacey Ave., East Quogue, N.Y. 11942; Bruce A. Moore, 29 N Paquatuck Ave., East Moriches, N.Y. 11940

[21] Appl. No.: 707,958

[22] Filed: May 22, 1991

Related U.S. Application Data

[63] Continuation of Ser. No. 561,568, Aug. 2, 1992, abandoned.

[51] Int. Cl.5 .............................................. F16K 17/38
[52] U.S. Cl. .......................................... 137/80; 137/79; 337/322; 337/334; 307/117; 361/163
[58] Field of Search .............. 307/117; 361/161, 162, 361/163; 137/59, 62, 79, 80; 337/322, 334

[56] References Cited

U.S. PATENT DOCUMENTS

| | | | |
|---|---|---|---|
| 2,271,833 | 2/1942 | Shipman et al. | 137/79 |
| 2,775,291 | 12/1956 | Wilson | 361/163 |
| 2,892,063 | 6/1959 | Lang | 337/322 |
| 2,972,090 | 2/1961 | Lowrance | 361/162 |
| 3,258,567 | 6/1966 | Colavecchio | 337/334 |
| 3,590,335 | 6/1971 | Tetar | 361/161 |
| 3,738,609 | 6/1973 | Divigard | 137/79 |
| 3,812,872 | 5/1974 | Block et al. | 137/62 |
| 3,842,232 | 10/1974 | Long | 337/322 |
| 4,730,637 | 3/1988 | White | 137/468 |
| 4,848,389 | 7/1989 | Pirkle | 137/80 |

Primary Examiner—A. Michael Chambers
Attorney, Agent, or Firm—Staas & Halsey

[57] ABSTRACT

An automatic water supply shut-off system includes a shut-off valve movable between opened and closed positions in a line leading from the water supply. An electric motor actuates the shut-off valve and is electrically connected to a power source through an electric circuit so that when the circuit is closed the electric motor actuates the shut-off valve into the open position to allow water flow through the line. At least one temperature sensitive switch is disposed in the electrical circuit and is operative to normally close the electrical circuit above a predetermined temperature and to open the electrical circuit at or below the predetermined temperature, whereby the shut-off valve moves to the closed position.

7 Claims, 3 Drawing Sheets

TEMPERATURE SENSITIVE WATER SUPPLY SHUT-OFF SYSTEM

This application is a continuation, of application Ser. No. 07/561,568, filed Aug. 2, 1990, now abandoned.

BACKGROUND OF THE INVENTION

1. Field of the Invention

The present invention relates generally to the field of plumbing and, more specifically, to a system for shutting off a supply of water upon detection of a pipe-freezing condition.

2. Description of the Related Art

Freezing water in household plumbing results in millions of dollars worth of property damage every year. When water in a pipe freezes, it expands and, since the internal volume of the pipe is fixed, the pipe will rupture. After the pipe ruptures, water does not usually escape from the pipe until after thawing. However, once thawing occurs, the potential for property damage is great since a ruptured pipe is capable of releasing water at a high rate.

Usually the homeowner is not immediately aware of the ruptured pipe, for reasons such as the home may be used as a vacation home and not occupied frequently. Also, since the release of water does not usually occur until after thawing, a pipe may freeze overnight and then thaw during the day when the occupant is away from home for work or other reasons. Thus, most property damage occurs when the house is unoccupied.

Even if the house is occupied at the time the pipe thaws and water is released from the point of rupture, not all homeowners have convenient access to their water supply for the purpose of shutting off the same. Since pipe ruptures frequently occur within walls of the house, even a few minutes of water flow from the rupture can result in substantial property damage to wall board, electrical wiring, carpets, furniture, etc.

A need exists for a simple, reliable system for shutting off the supply of water in the event of a freeze condition.

SUMMARY OF THE INVENTION

An object of the present invention is to provide an automatic water shut-off system capable of cutting off the water supply when a predetermined temperature is sensed.

Another object of the present invention is to provide an automatic water shut-off system which is relatively simple in construction and cost effective to produce, and can be purchased in kit form.

Yet another object of the present invention is to provide a system for shutting off a water supply in which the sensors used in the system shut off power to an actuator.

Another object of the present invention is to provide an emergency on/off switch for a water supply shut-off valve so that the water supply can be manually shut off from a location remote from the water supply.

These and other objects of the invention are met by providing an automatic water supply shut-off system which includes a shut-off valve movable between open and closed positions in a line leading from the water supply, an electric motor for actuating the shut-off valve and being electrically connected to a power source through an electrical circuit so that when the electrical circuit is closed the electric motor actuates the shut-off valve into the open position to allow water flow through the line, and at least one temperature sensitive switch disposed in the electrical circuit and being operative to normally close the electrical circuit above a predetermined temperature and to open the electrical circuit at or below the predetermined temperature, whereby the shut-off valve moves to a closed position.

Optionally, the system includes a manually operated on/off switch located remotely from the water supply.

These and other features and advantages of the automatic water supply shut-off system according to the present invention will become more apparent with reference to the following detailed description and drawings.

DETAILED DESCRIPTION OF THE PREFERRED EMBODIMENTS

Figure 1:
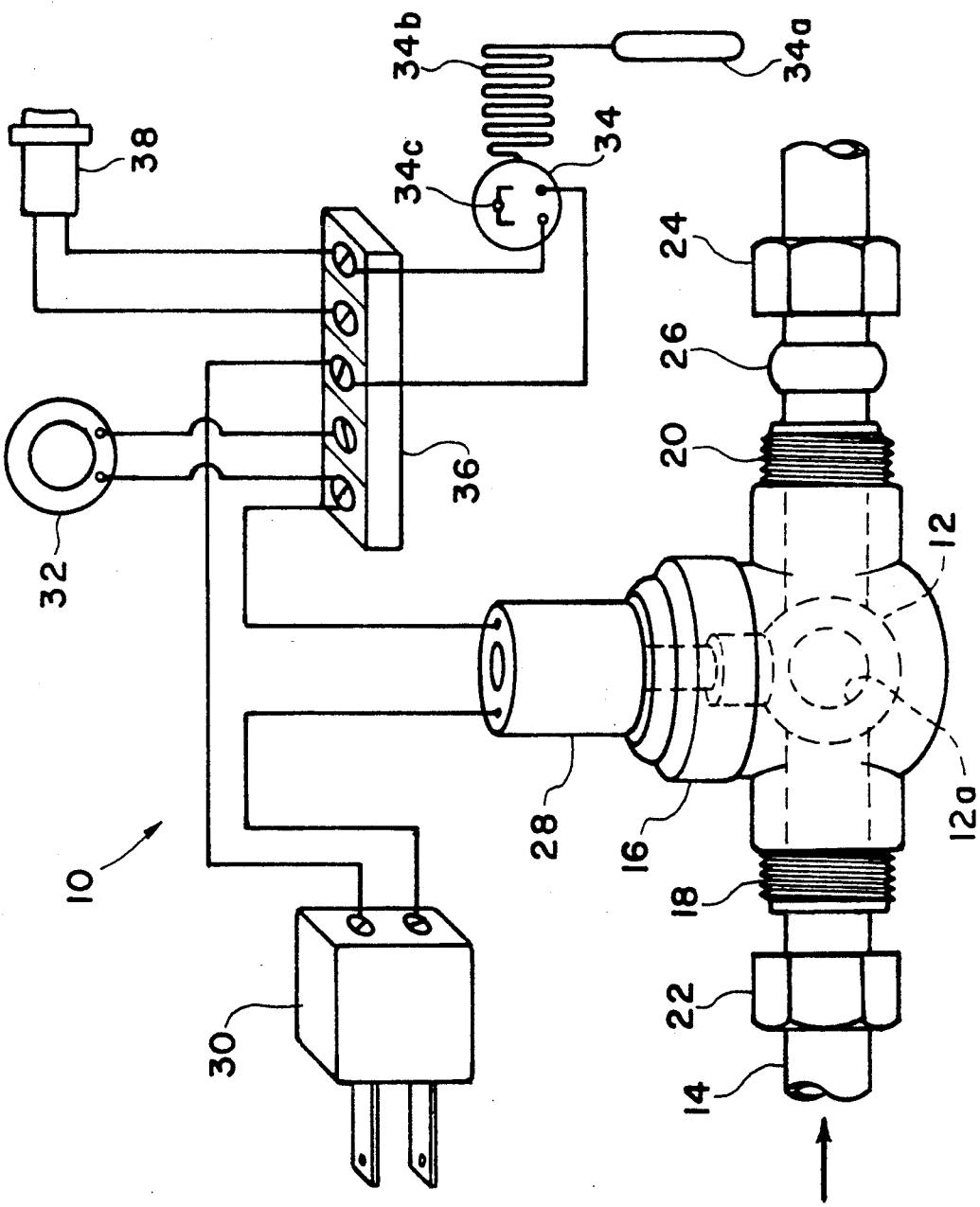
FIG. 1 is a schematic view of a system according to a first preferred embodiment of the present invention.

Referring now to FIG. 1, an automatic water supply shut-off system according to the present invention is generally referred to by the numeral 10, and includes a shut-off valve 12 movable between open and closed positions in a line 14 leading from a water supply, for example, a metered central water supply or from a well which pumps water to a pressure tank within the household. The metered water supply, as well as the pressure tank are normally disposed in the basement or, for houses without basements, in garages. Generally, the water supply has a manually operated gate valve having a circular handle, and this valve can be used to shut off the water supply when a rupture occurs. The problem, as discussed before, is that the normal household water supply shut-off valve cannot be manually closed until after substantial damage has been done.

The automatic shut-off valve 12 of the present invention is disposed in a valve body which is provided with inlet and outlet fittings 18 and 20, respectively so as to couple the line 14 to the opposite ends of the body 16 with threaded fasteners 22 and 24 which coact with compression ferrules 26 to create a water-tight fit. The valve body can be fitted into an existing pipe, preferably near the source or water supply, either upstream or downstream of the material shut-off valve (not shown). Alternatively, the valve could be conventionally plumbed by using copper mail adapters or other conventional plumbing fixtures.

A solenoid 28 is mounted on the valve body 16 and is operatively connected to the valve 12 for actuating the shut-off valve, thereby driving same between open and closed positions. In the schematic illustration of FIG. 1, the valve 12 is shown as a ball valve which can be rotated 90° by the solenoid through intermediate drive means which converts linear motion of, for example, the stator of the solenoid to rotational movement of the valve, in order to move a central passageway 12$a$ of the valve 12 between positions of alignment with the line 14 and non-alignment. In the non-alignment position, the passageway is turned 90° to the line 14, thus constituting a blocking position as show in FIG. 1. Other types of valves can be employed such as gate valves which move axially into and out of blocking positions within the body 16, and diaphragm valves, where the solenoid moves a diaphragm between blocking and non-blocking positions.

The solenoid 28 is electrically connected to a power source 30 which is preferably a 110≧24 volt AC step-down transformer which supplies power to the 24 volt solenoid by plugging into a normal household outlet.

An electrical circuit connects the power supply to the solenoid and to at least one temperature sensitive switch 32 and 34 so that when the circuit is closed the electric motor or solenoid 28 actuates the shut-off valve 12 into the open position to allow water flow through the line 14. If there is more than one temperature sensitive switch, the switches are arranged in series so that if any one of these switches is open, the power supply is cut off to the solenoid and the valve 12 will return to the closed position by return means, such as a spring return associated with the solenoid. This arrangement provides that when power is on the system will operate normally, but if power is cut off the system will fail safe, such that the valve 12 will move to the closed position in the event of a loss of power.

In FIG. 1, two sensors 32 and 34 are illustrated. These are connected to the rest of the system through a terminal block 36, which can be expanded in size to match the required number of sensors. Also, a manually operated switch 38 can optionally be provided in the system. This switch is preferably located within the house such as in the kitchen or any other location where the occupants can easily and quickly shut off the water supply without having to locate the manually operated water supply shut-off valve. This feature is particularly useful for elderly and handicapped people.

Figure 2:
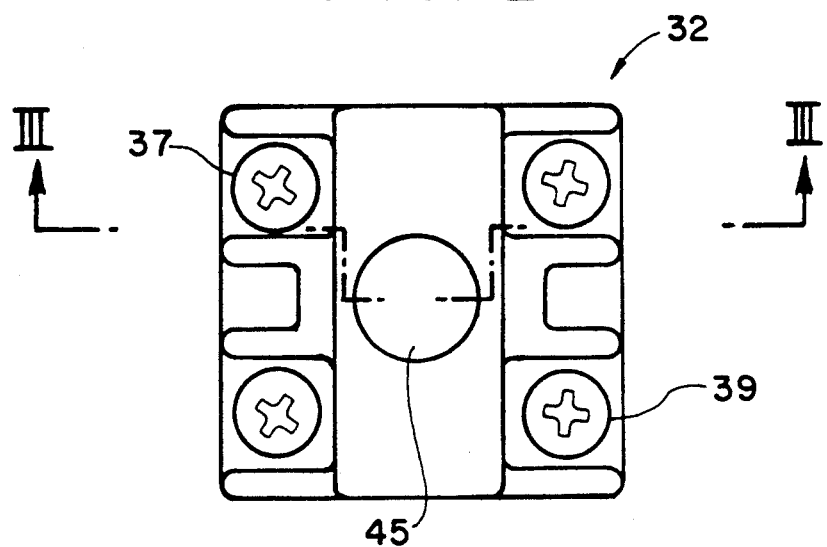
FIG. 2 is a rear view of a bi-metallic disk sensor used in the system of FIG. 1.
Figure 3A:
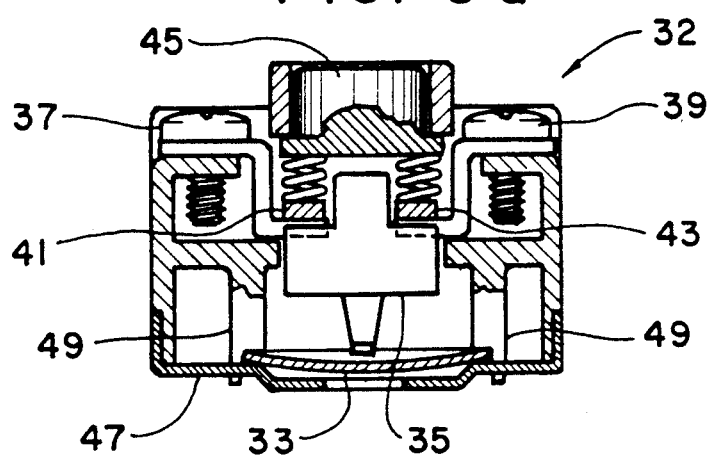
FIGS. 3($a$) and 3($b$) are sectional views of the sensor of FIG. 2, showing switch-closed and switch-open positions.
Figure 3B:
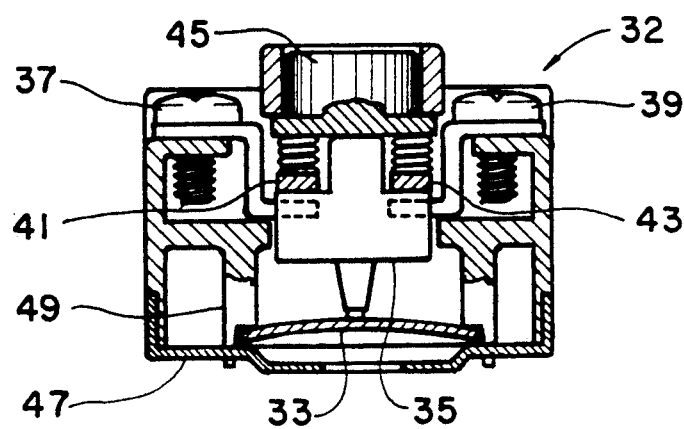

An essential aspect of the present invention is the sensor itself, which in one embodiment is a switching device. Referring to FIGS. 2 and 3(a) and 3(b), the switch 32 employs a bi-metallic disk (33) to make and break an electrical contact. The disk is made of different metals which have different thermal expansion properties so that, at a predetermined temperature, the disk pops into a warped position. When the disk warps, it is held in a position in which it is capable of separating electrical contacts so as to open the electrical circuit and thereby cut the power supply from the solenoid. When the power supply is cut to the solenoid, the shut-off valve returns to the closed position, preferably by a return spring (not shown).

FIG. 3(a) shows the switch 32 in the normally closed position, whereby at temperatures above 36° F., plus or minus 3°, for example, the disk 33 is warped towards the outside of the switch and thus has a concave surface which abuts an axially movable cross piece 35. Normally, an electrical circuit is completed from terminals 37 to terminals 39 by conductive bars 41 and 43 which are spring biased into electrical contact with corresponding contact pieces of the terminals. When the disk 33 warps, as shown in FIG. 3(b), the cross piece 35 moves upwardly and lifts the conductive bars 41 and 43 off the contact pieces, thereby opening the circuit and preventing electricity from flowing through the switch. In this position, the disk 33 has a convex surface which pushes the cross piece 35 upwardly and holds it in an upward position until the disk 33 is manually re-set by pushing a reset button 45. The disk 33 is held in position between a cover plate 47 and mounting supports 49. Thus, when the re-set button 45 is pushed downwardly, the lower end of the cross piece 35 pushes the center of the disk 33 and causes it to "pop" back into the concave-warped position.

The present invention is thus based on the concept of the sensing of ambient air temperature. When the air temperature reaches a predetermined temperature, such that a freezing condition is eminent, the bi-metallic disk 33 of the switch 32 will war and thereby break an electrical contact within the switch block. Thus, the switch acts as a temperature sensor and operates mechanically, meaning that the sensor does not require electricity to "sense". Moreover, due to the simple construction of the sensor, the sensor will operate reliably and will be cost effective to produce. The sensor or switch 32 is not invasive to the plumbing system, in that it does not have to be disposed within the plumbing, and can be attached simply at any desired location within the house, such as at areas prone to freezing (north walls, for example).

Another important aspect of the bi-metallic disk is that, after the predetermined temperature of, for example, 36°, has been reached, and the disk has warped to break the electrical contact of the switch, the disk will maintain the warped shape until manually re-set. Thus, the switch 32 is provided with a reset button, whereby the switch will keep the circuit open until the reset button is pushed, so that the water supply is not prematurely re-opened. The sensor or switch 32 can be placed near the automatic shut-off valve !2 or it can be placed remotely anywhere a potential freezing problem exists within a building. The bi-metallic disk is, in one embodiment, about one inch in diameter and approximately one half millimeter in thickness.

In some situations, there exists a need to more closely and precisely sense the temperature of the ambient air. In this case, a sensor such as the one illustrated in FIG. 1 as element 34 can be used. The sensor 34 is nonetheless a switch which has a throw which is moved to the open position by fluid from a capillary tube 34a connected to a sensing bulb 34b. The sensing bulb can be inserted into a wall by drilling a very small hole in an inconspicuous location so that the sensing bulb is inserted into the wall. The switch itself can be mounted over the hole, nearly flush with the wall so as to be unobtrusive. As the temperature falls, fluid from within the capillary tube retreats and allows the throw to move into the open position. The sensor or switch 34 is also provided with a manual re-set 34c so that if the switch is open, thus opening the electrical circuit which includes a solenoid, the switch cannot be closed unless manually re-set. Capillary type sensors as described above are generally commercially available through White-Rogers.

A preferred embodiment of the present invention is a diaphragm type valve, in which a diaphragm normally closes a passageway through the valve body, and the diaphragm is moved to an open position by the solenoid. A solenoid and valve assembly of this type is commercially available through Richdel Company of Carson City, Nev., and through RAIN BIRD of Glendora, Calif. This type of valve and solenoid combination is used in irrigation systems.

Figure 4:
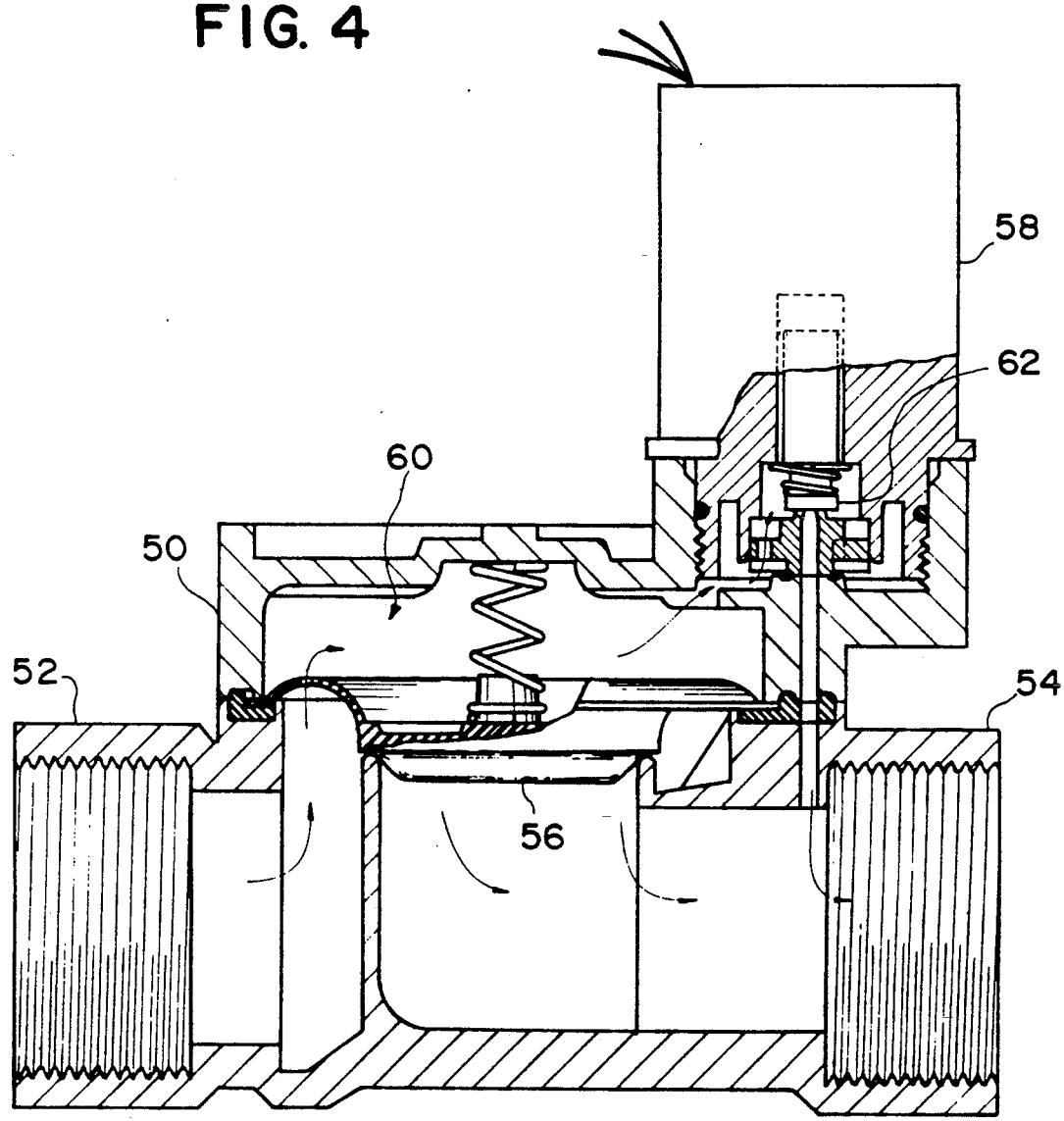
FIG. 4 is a sectional view showing details of a preferred diaphragm valve assembly.

FIG. 4 is a sectional view showing a preferred embodiment of the valves, to be used in place of the valve assembly shown in FIG. 4. The valve assembly includes a valve body 50 through which water passes by entering the inlet 52 and leaving the exit 54. A diaphragm valve element 56 is spring biased towards a seated position, whereby the flow of water from the inlet 52 to the outlet 54 is blocked. A solenoid 58 is used to regulate an air passage which communicates an upper chamber 60 of the valve body 50 with an area of the valve body downstream of the diaphragm valve element 56. In the open condition, the air passage is unrestricted and a venturi effect is created which evacuates air from the upper chamber 60, so that the diaphragm is permitted to move upwardly into an unseated position In this condition, the solenoid 58 may be energized so that the element 62 is lifted upwardly off a port of the air passage. If the switches described herein detect a freeze condition so that the solenoid is de-energized, the element 62 is returned by spring force to seat over the port of the air passage, thus preventing the venturi effect and allowing the diaphragm valve element 56 to seat.

This type of valve has been identified previously as the RAIN BIRD, which is manufactured in Glendora, Calif. A unique feature of this type of valve is that the solenoid can be turned, due to its threaded connection to the valve body 50, so that the air passage can be blocked by causing the end of the solenoid to seat completely in its receiving bore. This feature allows the valve assembly to be manually overridden, if necessary.

Numerous modifications and adaptations of the present invention will be apparent to those so skilled in the art and thus, it is intended by the following claims to cover all such modifications and adaptations which fall within the true spirit and scope of the invention.

What is claimed is:

1. An automatic water supply shut-off system for use in a building having an indoor plumbing network which includes a water supply pipe which supplies the network with water, comprising:
    a shut-off valve movable between open and closed positions in the water supply pipe, and being normally in the closed position;
    a one-way solenoid operatively coupled to the shut-off valve to move the shut-off valve from the closed position to the open position when the solenoid is energized, the shut-off valve returning to the closed position when the solenoid is deenergized;
    electrical circuit means including an electrical power source for supplying electric energy to the solenoid;
    sensor means disposed within the building for sensing air temperature with the building;
    ambient condition responsive switch means, responsive to the sensor means and being connected to the circuit means between the power source and the solenoid, and being normally in a first, closed circuit position, for opening the electrical circuit in a second, open circuit position when the sensor means senses a predetermined freeze condition temperature; and
    a manual switch re-set button coupled to the switch means and being operable to place the switch means in the first, closed circuit position after an occurrence of the predetermined freeze condition temperature.

2. An automatic water supply shut-off system according to claim 1, wherein the power supply is a 110 VAC-24 VAC stepdown transformer and the one-way solenoid includes a single 24 VAC electromagnetic coil.

3. An automatic water supply shut-off system according to claim 1, wherein the sensor means and the switch means comprise a plurality of sensors and a plurality of switches, each switch corresponding to one of the plurality of sensors.

4. An automatic water supply shut-off system according to claim 1, wherein the sensor means comprises a bimetallic disk having a predetermined warp temperature corresponding to the predetermined freeze condition temperature, and the switch means comprises a pair of electrical contacts and a throw bridging the pair of electrical contacts, the throw being movable out of electrical contact with the pair of electrical contacts by the bi-metallic disk when the disk warps.

5. An automatic water supply shut-off system according to claim 4, wherein the re-set button is juxtaposed the bi-metallic disk and is pushed manually to return the bi-metallic disk to an initial disposition corresponding to a pre-warp shape.

6. An automatic water supply shut-off system according to claim 1, further comprising a manual system shut-down switch connected to the electrical circuit means for manually shutting off power to the electrical circuit means from a position remote from the solenoid and the shut-off valve.

7. An automatic water supply shut-off system according to claim 1, wherein the sensing means comprises a capillary-type sensor, and the switch means comprises a throw movable out of electrical contact to an open position in response to movement of a capillary fluid disposed in a sensing bulb.

* * * * *